United States Patent [19]

Isnard

[11] 4,050,010
[45] Sept. 20, 1977

[54] APPARATUS UTILIZING A TEST SURFACE WITH A MAGNETIC FLUX GAP FOR DETECTING DIMENSIONAL DISCONFORMITIES OF MANUFACTURED ELEMENTS

[75] Inventor: Theophile Isnard, Pont de Claix Isere, France

[73] Assignee: Caterpillar France S.A., Isere, France

[21] Appl. No.: 660,948

[22] Filed: Feb. 24, 1976

[30] Foreign Application Priority Data

Feb. 26, 1975 France .................. 75.06015

[51] Int. Cl.² .......................................... G01R 33/12
[52] U.S. Cl. ........................... 324/34 R; 33/174 L; 209/80; 209/111.8
[58] Field of Search ............. 324/34 R, 34 D, 34 PS, 324/34 TK; 33/174 L; 209/80, 81 A, 111.8

[56] References Cited

U.S. PATENT DOCUMENTS

| 2,481,345 | 9/1949 | Reynst | 324/34 TK |
| 2,503,720 | 4/1950 | Gieseke | 324/34 R |
| 3,244,977 | 4/1966 | Folsom | 324/34 E |

FOREIGN PATENT DOCUMENTS

873,593  4/1953  Germany .................. 324/34 R

Primary Examiner—Robert J. Corcoran
Attorney, Agent, or Firm—Phillips, Moore, Weissenberger, Lempio & Majestic

[57] ABSTRACT

One or more dimensions of each of a series of similar manufactured elements, which are formed of magnetizable materials such as iron, steel, nickel or the like may be quickly checked for conformity to a predetermined value by momentarily positioning each successive element against an electromagnetic sensing device. The sensing device has a winding establishing a magnetic flux path through a core which is formed with one or more gaps in the magnetic circuit that are located to be spanned by a wrongly dimensioned or wrongly oriented one of the manufactured elements. Spanning of a flux gap of the core by a wrongly dimensioned or misoriented element changes the self-inductance value of the winding, and circuit means are provided for detecting such change in order to indicate the presence of a disconforming element or to actuate mechanism for rejecting or correcting the element.

8 Claims, 6 Drawing Figures

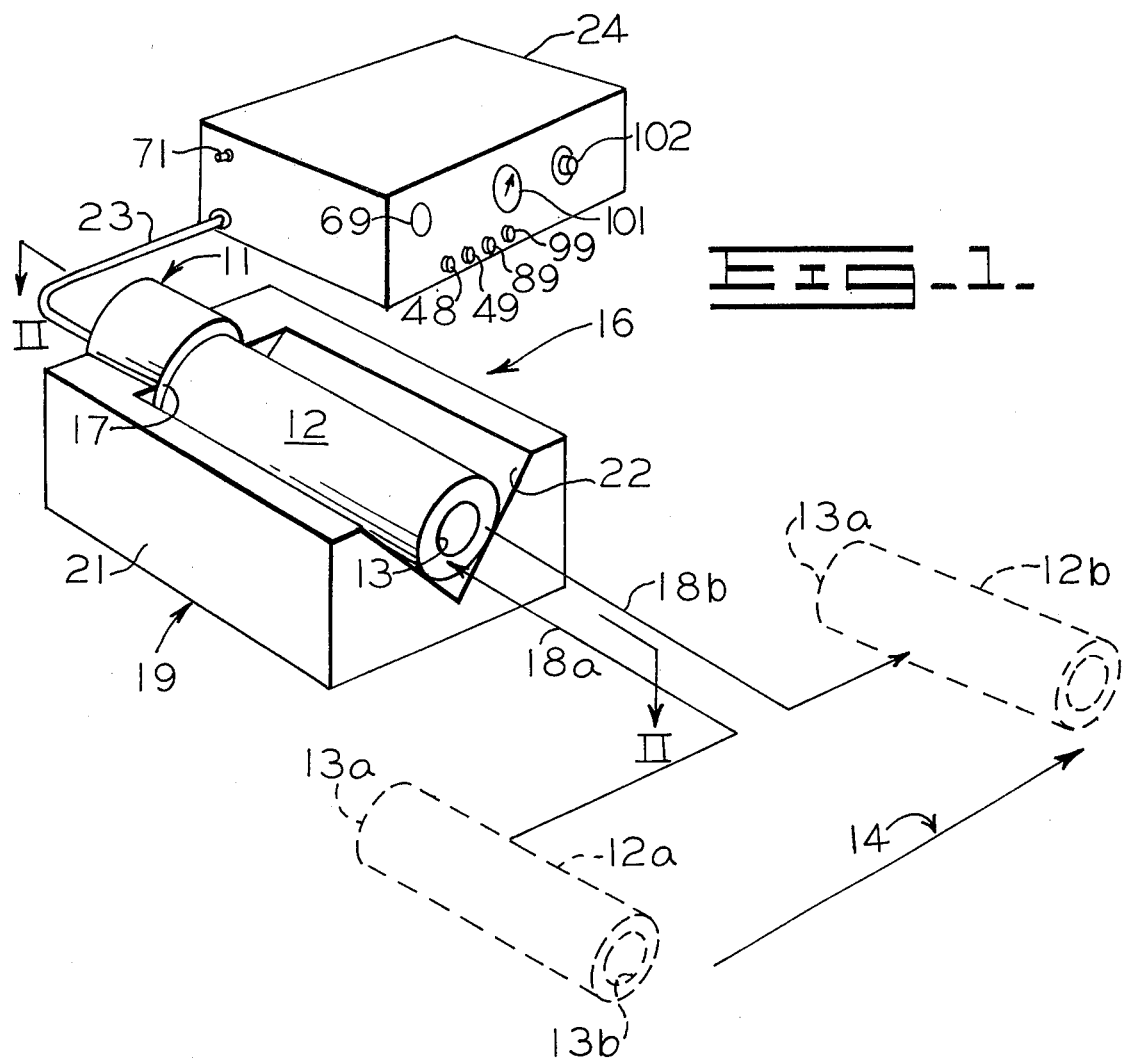
FIG. 1.
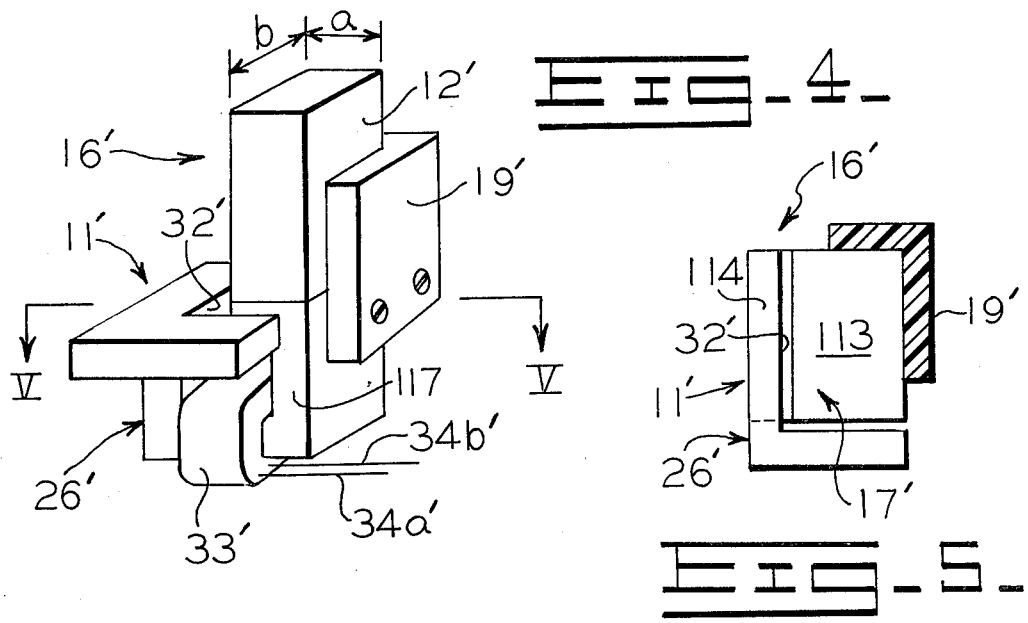
FIG. 4.
FIG. 5.

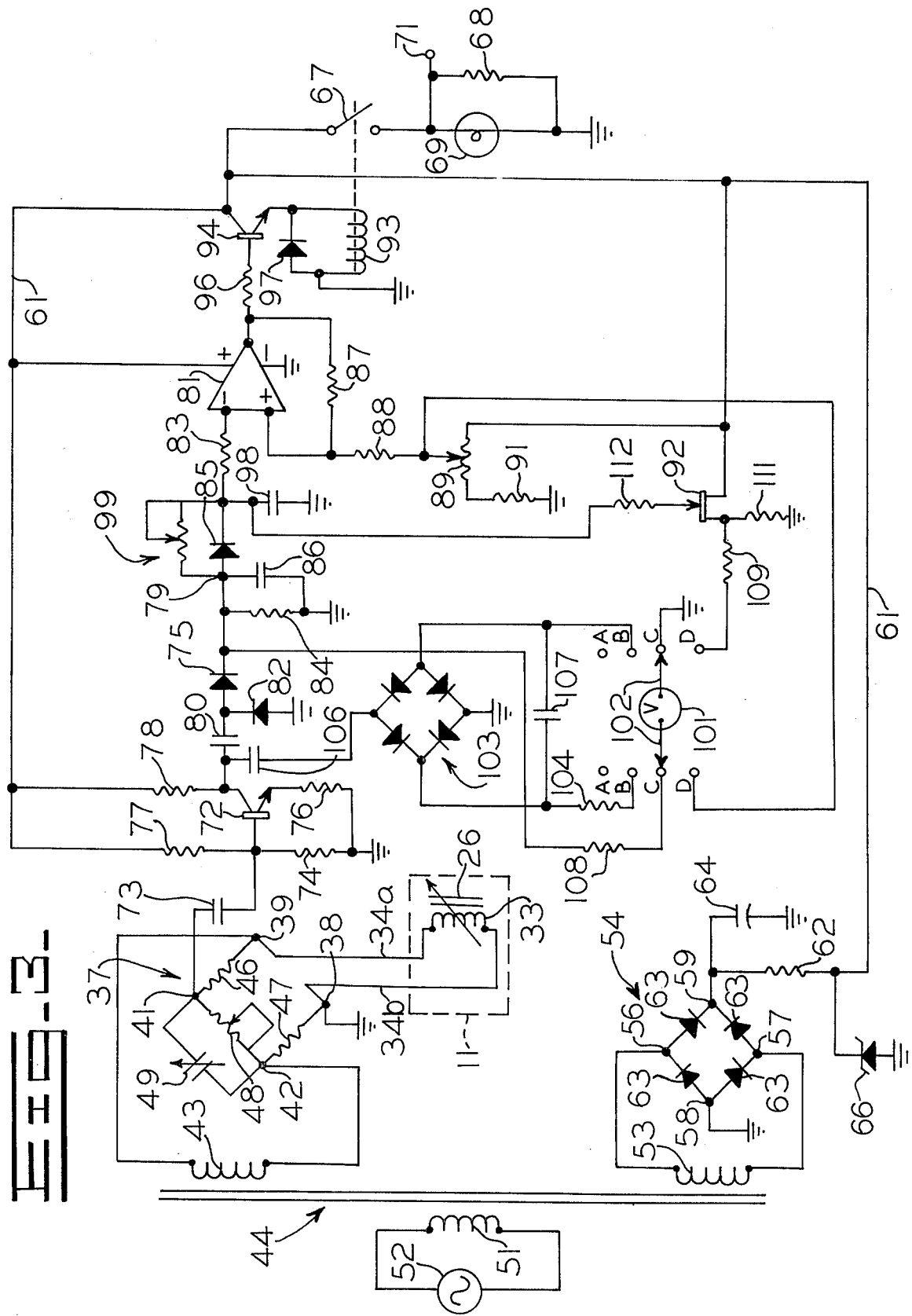

APPARATUS UTILIZING A TEST SURFACE WITH A MAGNETIC FLUX GAP FOR DETECTING DIMENSIONAL DISCONFORMITIES OF MANUFACTURED ELEMENTS

BACKGROUND OF THE INVENTION

This invention relates to quality control in manufacturing operations, and more particularly to apparatus for checking a sequence of manufactured elements for conformity to predetermined dimensional, configuration or orientation standards.

Where large numbers of similar elements such as machine parts are manufactured or otherwise processed, it is often necessary to check each successive part for conformity to some predetermined configuration along one or more dimensions of the part or to check for parts which may be misoriented relative to the others. This may variously be necessary in order to eliminate defective parts or to initiate operation of automatic machinery for correcting some detected dimensional or positional irregularity. In many instances it is unduly time consuming or costly to do this manually using simple measuring tools. Most such purely manual techniques rely upon visual tactile or other sensing operations by workmen. As a result, distractions, fatique or the like can cause occasional errors and detract from the general reliability of the checking process.

In order to provide for more rapid, efficient and reliable monitoring of manufactured parts, a variety of automatic checking devices have heretofore been developed. In general, these are undesirably complex and costly. Typically, such devices require movable mechanical sensing elements for checking dimensions or configurations of each part, as well as electrical circuits for detecting dimensional deviations on the basis of movements of the mechanical sensors. Such mechanisms are subject to wear, jamming and other malfunctions, and may be difficult to adjust.

SUMMARY OF THE INVENTION

This invention provides for detecting disconformities of any of a series of similar manufactured elements from a predetermined desired dimensional configuration or orientation, without requiring any movable mechanical sensor elements for this purpose, provided that the elements to be checked are formed of a ferromagnetic or magnetizable material such as iron, steel, nickel or the like.

The invention utilizes an electromagnetic sensing device which includes a ferromagnetic core and an electrical winding which may be energized to establish a magnetic flux path within the core. Guide means are provided for bringing the elements which are to be checked against a test surface of the core in a predetermined position thereon. One or more gaps are formed in the core at locations where a normally shaped and properly oriented element will not extend across the gaps when positioned as described above. If the element deviates from the desired configuration or orientation, it spans one or more portions of the gap in the core, thereby decreasing the reluctance of the magnetic flux path while correspondingly increasing the self-inductance of the winding.

Circuit means are provided for energizing the winding and for detecting the increase of winding inductance that occurs when a part having an undesired dimensional characteristic or orientation is positioned against the sensing device. The inductance sensing means produces a signal which may variously be caused to actuate an indicator, an alarm or automatic mechanism for rejecting or correcting the faulty part. In a preferred form, the circuit includes means for adjusting sensitivity to inductance changes, means for suppressing spurious signals which may be caused by very brief winding inductance variations, and self-contained means for monitoring the performance of internal portions of the circuit itself to facilitate adjustment and to assure reliability.

The apparatus is adaptable to checking one or more dimension or general configurational characteristics of a variety of different forms of element provided they are formed of magnetizable material, the configuration of the core and the configuration and position of the gaps in the core being modified as required for this purpose.

Accordingly, it is an object of this invention to facilitiate and simplify the checking of series of elements for conformance to a configurational or orientation standard. It is another object of the invention to provide a simple, reliable and economical means for detecting any of a sequence of similar manufactured parts which differ from a desired configuration in some dimensional characteristic or which may be misoriented relative to others in the series.

The invention, together with further objects and advantages thereof will best be understood by reference to the following description of preferred embodiments in conjunction with the accompanying drawings.

BRIEF DESCRIPTION OF THE DRAWINGS

In the accompanying drawings:

FIG. 1 is a perspective view of a first embodiment of the invention as adapted for determining if each of a sequence of cylindrical bushings is properly oriented by checking the internal diameter of an adjacent end of each bushing as it is progressed along a predetermined path, FIG. 3 is an electrical circuit diagram of the apparatus of FIG. 1, FIG. 4 is a perspective view of a modification of the invention as adapted for detecting if any of a sequence of rectangular parts have end surface dimensions exceeding predetermined desired values, and FIG. 5 is a cross-section view of the apparatus of FIG. 4, taken along lines V—V thereof.

DESCRIPTION OF THE PREFERRED EMBODIMENT

Figure 2:
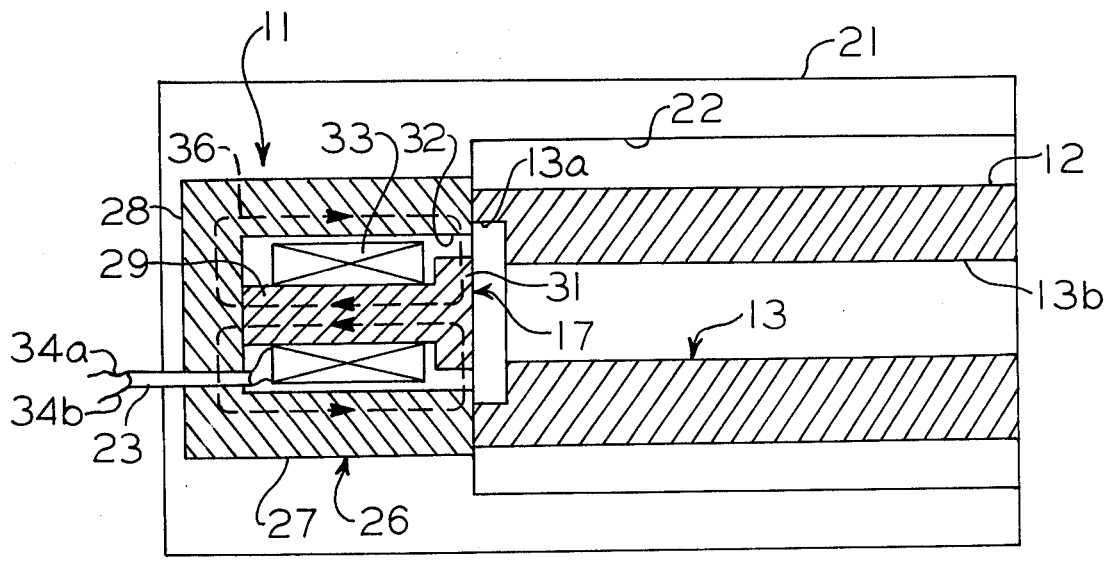
FIG. 2 is a plan section view taken along line II—II of FIG. 1, and showing the internal construction of a bushing end configuration sensing device thereof and further showing a properly oriented bushing in the process of being checked.

Referring now to FIG. 1, the invention is adaptable to checking one or more dimensions of a particular surface of a series of machine parts or other elements which are intended to be identical, and the sensing device 11 against which the elements are disposed for checking purposes may take a variety of forms according to the configuration of the particular elements which are to be checked. In the embodiment depicted in FIG. 1, the elements to be checked are cylindrical bushings 12 and the particular dimension of the bushings which is checked in this example is the diameter of the axial bore 13 through the bushings. In some cases, it may be desirable to check some dimensions such as the diameters of bushing bores 13, simply to assure that it does not exceed a predetermined manufacturing standard or in other cases, such as the present example, such checking may serve a further purpose. In the example of FIG. 1, the purpose of checking the internal diameter of one end of each bushing 12 is to assure that the successive bushings all have like ends facing in the same direction as the bushings are traveled along a particular path represented by arrow 14. Path 14 may, for example, be a path of travel of the bushings through processing machinery of any of various known kinds in which the bushings must all be oriented in the same direction. By referring momentarily to FIG. 2, it may be seen that the bushing 12 each have an internal bore 13 which is of larger diameter at one end 13a than at the other end 13b. In this example, it is desired that the bushings 12 be traveled along path 14 with the ends 13a of larger internal diameter being to the left as viewed in FIG. 1, and the checking apparatus 16 of the present invention is utilized to identify any bushing which may have accidentally been reversed so that it may be turned over to the correct orientation either manually or by automatic machinery provided for that purpose.

The sensing device 11 portion of the apparatus in this example is of cylindrical configuration in accordance with the cylindricity of the bushings to be checked, and has a circular test surface 17 at one end against which the adjacent end surface of each bushing is momentarily disposed as the bushing progresses along path 14. In being moved towards test surface 17 and then away therefrom as indicated by angled arrows 18a and 18b respectively, the bushing should be maintained in strictly coaxial relationship with the sensing device 11 at least while in the immediate vicinity thereof for reasons which will hereinafter be apparent. Such movement of the bushings may be accomplished either manually or by automatic mechanism provided for that purpose.

Each bushing to be checked must be briefly disposed against test surface 17 of the sensing device 11 in a precise predetermined positional relationship therewith which in the present example is a coaxial relationship. Guide means 19 are provided to assure that this relationship is established. In the present example, the guide means 19 is a block 21, having a slot 22 of V-shaped cross section, and having the sensing device 11 mounted at one end with the test surface 17 facing the end of the slot. Slot 22 is proportioned to support each bushing 12 in the desired coaxial relationship with test surface 17. A multi-conductor electrical cable 23 connects sensing device 11 with an electric console 24 containing power supply and detection circuits which will hereinafter be described.

Referring now again to FIG. 2, sensing device 11 has a core 26 formed of iron or other ferromagnetic material, the core having a cylindrical outer portion 27 which may be intregal with a circular end portion 28 and further has a rod like center portion 29 extending from end portion 28 along the axis of the device to terminate at a flange portion 31 which, together with the adjacent end of the cylinder portion 26 forms the test surface 17 against which the bushings 12 are momentarily positioned. Flange portion 31 has a diameter slightly greater than the internal diameter of end 13b of the bushings and the internal diameter of cylindrical portion 26 of the core is slightly smaller than the internal diameter of the other end 13a of the bushings while being greater than that of the flanged portion 31. Thus an annular gap 32 is present in the core at end surface 17 of the test device, the gap having inside and outside diameters intermediate between the inside diameters of the two ends of the bushing.

To establish a magnetic flux within the core 26, an annular winding or coil 33 is disposed coaxially around the rod portion 29 of the core within the cylinder portion 26 and has a pair of electrical leads 34a and 34b extending out of the core through cable 23.

Thus upon electrical energization of the winding 33, a closed magnetic flux path is established within the core 26 which, as indicated by flux lines 36, extends along rod portion 29 of the core, then radially outward within end portion 28, then in an opposite direction along the cylindrical outer portion 26 of the core, and then radially inward across gap 32 and then back to the rod portion through flange portion 31.

In the absence of a bushing 12, the core 26 will exhibit a magnetic reluctance value determined by the proportions of the core and the characteristics of the material of which it is formed. As the winding 33 is inductively coupled to the core, the self-inductance of the winding will in turn have some fixed value. The self-inductance of such a winding is an inverse function of the reluctance of the assoicated core. Thus, if the reluctance of the core should be decreased, for example by the presence of magnetic material spanning the gap 32, then the self-inductance of the winding will exhibit an increase. This characteristic of the core and winding combination is relied upon to determine which end of each bushing 12 is adjacent test surface 17 of the core.

Figure 2A:
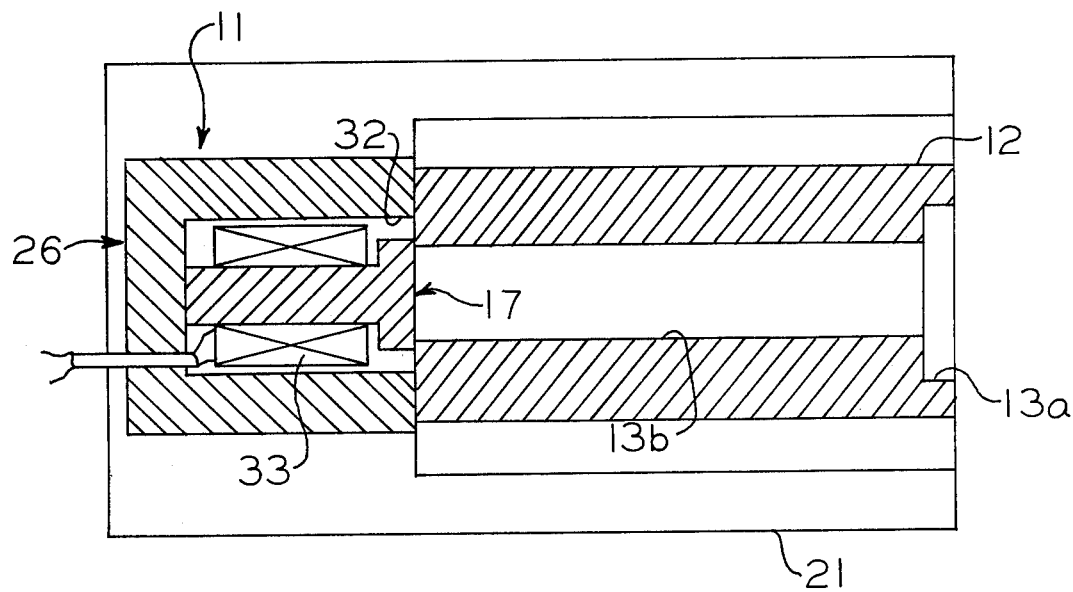
FIG. 2A is a plan section view corresponding to FIG. 2, but illustrating conditions which exist when an improperly oriented bushing is present at the sensing device.

If, as illustrated in FIG. 2, the bushing end 13a of large diameter is adjacent test surface 17, core gap 32 is not spanned by ferromagnetic material and the presence of the bushing does not have a significant effect on the reluctance of the core. But if the bushing 12 should be inverted end to end as illustrated in FIG. 2A, then gap 32 of the core 26 is spanned by ferromagnetic material and the reluctance of the core decreases substantially. The self-inductance of winding 33 is correspondingly increased under the condition depicted in FIG. 2A, and circuit means to be hereinafter described detects this increase in self-inductance to produce a signal indicative of the inversion of the bushing 12.

Considering now a suitable construction for the circuit means, reference should be made to FIG. 3. Electrically, the sensing device 11 including winding 33 and core 26 is essentially a variable inductance which has one inductance value in the absence of a bushing or when an adjacent bushing is properly oriented but which exhibits a higher inductance value when an improperly oriented bushing is present. To detect this inductance change, winding 33 is connected through leads 34a and 34b to form one of the four legs of a bridge circuit 37.

Bridge circuit 37 had a first terminal 38 to which coil lead 34b connects and which is grounded, a second terminal 39 to which the other coil lead 34a connects, and has third and fourth terminals 41 and 42. To energize the bridge, terminals 39 and 42 are connected to opposite ends of a first secondary winding 43 of a power transformer 44. A resistor 46 is connected between terminals 39 and 41, another resistor 47 is connected between terminals 38 and 42, while an additional and variable resistor 48 is connected between terminals 41 and 42 in parallel with a adjustable capacitor 49. Resistors 46, 47 and 48 are selected to have resistance values equivalent to the impedance value which winding 33 exhibits in the absence of a bushing at the sensing device 11. Thus, in the absence of a bushing, the bridge 37 is balanced and no significant voltage difference is present between terminals 38 and 41 of the bridge. Resistor 48 is variable in order that adjustments may be made to assure balance under this condition, and the adjustable capacitance 49 provides for phase compensation adjustment. If an improperly oriented bushing should be disposed at sensing device 11 as previously described, the inductance increase at winding 33 is accompanied by a corresponding impedance increase. This unbalances the bridge 37, and causes a voltage difference to appear between terminals 38 and 41.

Power transformer 44 may have a primary winding 51 connected to any suitable source 52 of alternating current. In order to provide a regulated direct current for other components of the circuit to be hereinafter described, the transformer may have an additional secondary winding 53 connected to a rectifier which in this instance is a diode bridge circuit 54. Bridge 54 has input terminals 56 and 57 to which opposite ends of secondary winding 53 connect, and has output terminals 58 and 59, terminal 58 being grounded and terminal 59 being coupled to a DC supply conductor 61 through a resistor 62. Four diodes 63 complete the bridge 54, each diode being connected between a separate pair of the terminals 56, 57, 58 and 59 with terminal 59 being connected to the positive sides of the two adjacent diodes 63 while terminal 58 connects to the negative sides of the other two diodes. A capacitor 64 is connected between terminal 59 and ground to smoooth the output waveform, and a zener diode 66 is connected between DC supply conductor 61 and ground to maintain a constant voltage thereon.

As pointed out above, the appearance of an AC voltage at terminal 41 of bridge 37 is indicative of the detection of a misoriented bushing. This voltage is detected and caused to produce an output signal by closing a set of normally open output relay contacts 67, which in this example are connected between DC supply conductor 61 and ground through a resistor 68 and also through an indicator lamp 69 which is connected in parallel with the resistor 68. Thus lamp 69 is energized by closing of relay contacts 67 to give a visual indication of the detection of a misoriented bushing. It will be apparent that other indicator means such as audible alarms may be substituted for the indicator lamp 69. Further, upon closing of the relay contact 67, a signal voltage appears at a terminal 71 between the relay contacts and resistor 68. The signal may be utilized to actuate suitable automatic bushing position correcting mechanisms or for other purposes as desired.

Considering now suitable circuitry for operating the output relay contacts 67 in response to the appearance of an AC voltage at bridge terminal 41, such terminal is connected to the base of an amplifying transistor 72 through a coupling capacitor 73. The base and emitter of transistor 72 are connected to ground through resistors 74 and 76 respectively and bias voltage is supplied to the base of transistor 72 through another resistor 77 which connects to DC supply conductor 61. Still another resistor 78 is connected between the DC supply conductor and the collector of transistor 72. Thus the appearance of an AC voltage at bridge terminal 41 results in an amplified AC waveform appearing at the collector of transistor 72. The collector of the transistor is coupled to a terminal 79 through a capacitor 80 and a diode 75. Another inverted diode 82 is connected between ground and the anode of diode 75. Thus diodes 75 and 82 rectify the AC waveform to apply a DC voltage to terminal 79 in response to the AC voltage at bridge terminal 41. This DC voltage is applied to the inverting input of an operational amplifier 81 through another diode 85 and an input resistor 83. A resistor 84 and capacitor 86 are connected between terminal 79 and ground to complete the rectifying action of diodes 75 and 82 by smoothing ripple in the DC signal applied to terminal 79.

Operational amplifier 81 is connected to operate in the Schmitt trigger mode, and for this purpose may have a power supply circuit connected between DC supply conductor 61 and ground, a compensating resistor 87 connected between the output and the non-inverting input with the non-inverting input being connected to ground through a resistor 88, the movable tap of a potentiometer 89 and another resistor 91. The other end of the resistive element of potentionmeter 89 is connected to DC supply conductor 61. Thus potentiometer 89 enables adjustment of the trigger threshold of the Schmitt trigger circuit formed by amplifier 81.

Accordingly, when the DC voltage applied to the inverting input of amplifier 81 reaches a predetermined level as determined by the setting of potentiometer 89, a trigger action occurs and a voltage appears at the output of the amplifier 81 which output voltage remains until the signal at the amplifier input drops to a substantially lower level in accordance with the Schmitt trigger action. This output voltage from amplifier 81 is caused to energize a driver coil 93 which closes output relay contacts 67 as previously described. Impedance matching is provided for by connecting one end of driver coil 93 to ground and by connecting the other end to DC supply conductor 61 through the emitter-collector circuit of another transistor 94. Transistor 94 has a base connected to the output of amplifier 81 through a resistor 96. A diode 97 may be connected between the ends of driver coil 93 to supress any inverted transient voltage spikes which might occur.

To prevent production of spurious output signals in response to very brief voltage rises at bridge terminal 41 such as might occur from accidental movement of a properly oriented bushing or form some other cause, a time delay circuit is provided between terminal 79 and amplifier 81 to delay triggering of the amplifier until an incoming signal has continued for a predetermined time. For this purpose a capacitor 98 may be connected between ground and the junction between diode 85 and amplifier input resistor 83, while a potentiometer 99 is connected in parallel with diode 85. Thus a DC signal appearing at terminal 79 is not transmitted on to trigger amplifier 81 until such time as capacitor 98 has charged up a voltage level required for this purpose. If the duration of the signal is less than that which can be relied upon as indicative of a misoriented bushing, the partial charge of capacitor 98 will gradually discharge through potentiometer 99 and resistor 84 without triggering the amplifier. Potentiometer 99 provides for adjustment of the signal duration required for triggering the amplifier. It should also be noted that capacitor 98 assures that once the amplifier is triggered it will remain in this condition for a predetermined period of time as the voltage accumulated on the capacitor 98 must leak away through potentiometer 99 and resistor 84 to a low level before the Schmitt trigger connected amplifier 81 reverts to the original condition. Misoriented bushing signals of undesirably brief duration are thereby prevented.

Accordingly, the circuit described above provides an output signal, produced by closing of relay contact 67, in response to a change of self-inductance of winding 33 of more than a predetermined magnitude and duration, this self-inductance change being indicative of a misoriented bushing as previously described. Means have also been described for making various sensitivity and threshold adjustments in the circuit to optimize performance and to adapt to different operating conditions. Such adjustments may be facilitated if built-in means are provided for measuring the voltages present at certain key points in the circuit. A voltmeter 101 may be provided in the circuit for this purpose. Switch means 102 are provided for selectively connecting the voltmeter between any selected one of four pairs of contacts A, B, C and D. The first set of contacts A are unconnected to other portions of the circuit and simply define an Off position for the voltmeter 101. Operation of the switch means 102 to connect the voltmeter between terminals B enables measurement of the AC output signal of amplifier transistor 72 which in turn facilitates adjustment of the bridge 37 by means of potentiometer 48 and variable capacitor 49 for the purpose of eliminating any significant voltage signal at bridge terminal 41 in the absence of a misoriented bushing at sensing device 11. For this purpose, one contact B connects to one output terminal of another diode bridge rectifier circuit 103 which may be similar to the bridge 54 previously described, while the other contact B connects to the other output terminal of bridge 103 through a current limiting resistor 104. One input of bridge 103 is grounded while the other input connects to the collector of amplifier transistor 72 through a coupling capacitor 106. To complete the rectifying action, a smoothing capacitor 107 is connected across the output terminals of bridge 103. Bridge 103 in conjunction with capacitor 107 thus rectifies the AC voltage present at the collector of amplifier transistor 72 and applies such rectified voltage to contacts B for measurement by voltmeter 101.

One of a third set of contacts C is grounded while the other contact C connects to terminal 79 through a current limiting resistor 108 to enable checking of the rectified signal magnitude which is applied to time delay capacitor 98 through diode 85 and to the amplifier 81. The final set of contacts D provide for measurement of the threshold voltage which must be applied across the inputs of amplifier 81 to trigger the amplifier. This facilitates use of potentiometer 89 to make adjustments in the threshold voltage if needed. For this purpose, one of the contacts D is connected to the non-inverting input of amplifier 81 through resistor 88. The other of the contacts D is connected to the source terminal of a field effect transistor 92 through a resistor 109 and that transistor terminal is also grounded through a resistor 111. The drain terminal of transistor 92 is connected to DC power conductor 61 while the gate of the transistor 92 is connected to the junction between amplifier input resistor 83 and diode 85 through another resistor 112. The result of including the field effect transistor 92 in the contact D circuit is to create a virtually infinite input impedance to prevent the voltage undergoing measurement from being altered by interference effects.

The example of the invention described above with reference to FIGS. 1 to 3 is particularly adapted for detecting any end to end misorientation of bushings in a progression of such bushings, and accomplishes this by checking the inside diameter of one end of each bushing. It will be apparent that the apparatus is not limited to this particular usage but may be modified to perform any of a large number of parts monitoring operations. In general, the invention may be adapted to detect any one of a progression of elements which deviates from a predetermined dimensional configuration at some accessible surface. The variations in the test surface of the sensing device which may be provided for this purpose are as numerous as the variations in the shape of diverse manufactured parts and for purposes of illustration, an additional example of a sensing device 11', suitable for a different purpose, is illustrated in FIGS. 4 and 5.

The sensing device 11' of FIGS. 4 and 5 is adapted to determine if any of a series of rectangular block shaped ferromagnetic objects 12' have an end surface which exceeds a predetermined dimension in either direction (a) or in the right angled direction (b) or in both directions. Accordingly, the test surface 17' against which the blocks 12' are temporarily disposed for monitoring has a rectangular first portion 113 with dimensions conforming dimensions (a) and (b) of the block 12' and has an angled outer portion 114 which extends along two sides of portion 113 but which is separated therefrom by a small gap 32'. The two portions of the test surface 17' are connected, beneath test surface 17', by a U-shaped yoke portion 117 having a winding 33' coupled thereto to establish a magnetic flux path within the core 26'. The lead wires 34a' and 34b' from winding 33' may connect with a detection circuit similar to that previously described with respect to the first embodiment of the invention. To position successive ones of the block-shaped objects 12' on test surface 17', an angled upwardly extending guide 19', preferably formed of non-magnetic material such as plastic, is secured to the core 26' at one corner of portion 113.

Thus the previously described circuit will produce no output signal as long as each block 12' which is positioned on test surface 17' does not extend at least partly across the gap 32' in either direction (a) or (b). If a wrongly dimensioned block 12' should extend across the gap 32' in one direction or both, the reluctance of core 26' is increased and the self-inductance of winding 33' is corresponding decreased to trigger the associated detection circuit as previously described.

The gap 32' is shown as being fairly broad in FIGS. 4 and 5 for clarity of illustration, but can in practice be made considerably narrower in order to detect slight deviation of the objects 12' from predetermined dimensions. While the examples of the invention herein described function to detect an oversized condition of an outside measurement of objects or an undersized condition of an inside diameter of objects, the invention may also be adapted to monitor for the opposite conditions. For example, if the gap 32' in the sensing device 19' of FIGS. 4 and 5 is proportioned to be just covered by a normal sized object 12', then an undersized object will not span the gap. In that case, with reference to FIG. 3, the presence of an undersized object is indicated by a failure of relay contacts 67 to close while the object is positioned on the test surface.

Accordingly, many modifications of the apparatus are possible, and it is not intended to limit the invention except as defined in the following claims.

What is claimed is:

1. Apparatus for determining if at least one dimension of each of a series of ferromagnetic elements differs from a predetermined desired value, comprising:

an electromagnetic sensing device having a ferromagnetic core forming a magnetic flux path, said core having an exteriorly exposed test surface against which successive ones of said elements may be disposed in a predetermined position relative thereto, said core having a gap in said flux path at said test surface with said gap being located in said test surface to be spanned by disconforming ones of said elements which differ along said dimension from other conforming ones of said elements that conform to said desired value, said gap being further located in said test surface to remain unspanned by said conforming ones of said elements thereby causing said core to exhibit a substantially lower reluctance when a disconforming one of said elements is positioned against said test surface as compared with when a conforming one is positioned thereagainst, said sensing device further having an electrical winding magnetically coupled to said core to establish said magnetic flux therein, a power supply for electrically energizing said winding, circuit means for detecting a predetermind degree of change of the self-inductance value of said winding whereby said disconforming ones of said elements may be distinguished from said conforming ones thereof, and guide means for receiving each of said elements in sequence and for defining said predetermined position of said elements at said test surface of said sensing device.

2. The combination defined in claim 1 wherein said power supply is an alternating current source coupled to said winding of said sensing device, and wherein said circuit means for detecting said predetermined degree of change of the self-inductance value of said winding includes a bridge circuit having said winding as one arm thereof and having output terminals, said bridge being balanced to produce a minimum voltage difference between said output terminals thereof in the absence of ferromagnetic material spanning said gap of said core and to produce a higher output voltage between said output terminals when said gap is spanned by ferromagnetic material, and wherein said circuit means for detecting a predetermined degree of change of the self-inductance value of said winding further comprises a rectifier coupled to said output terminals of said bridge circuit, a set of relay contacts, a Schmitt trigger circuit having an input receiving said output of said rectifier, and means for operating said relay contacts in response to triggering of said Schmitt trigger circuit.

3. The combination defined in claim 2 further comprising time delay means connected between said rectifier and said means for operating said relay contact to prevent operation of said relay contacts unless said output from said rectifier continues for a predetermined interval of time.

4. The combination defined in claim 3 wherein said time delay means comprises a capacitor connected to the current path from said rectifier to said means for operating said relay contacts and a resistor connected to said capacitor for slowly discharging said capacitor.

5. The combination defined in claim 6 further comprising a voltmeter and switch means for selectively connecting said voltmeter to any selected one of a plurality of conductive points in said circuit means, said plurality of conductive points including at least a first point exhibiting a voltage indicative of said output voltage of said bridge circuit and a second point exhibiting a voltage indicative of the voltage at said input of said Schmitt trigger circuit, and means for adjusting voltage levels which occur at said conductive points during operation of said circuit means.

6. The combination defined in claim 1 wherein said power supply is an alternating current power supply and wherein circuit means for detecting a predetermined degree of change of the self-inductance value of said winding comprises a bridge circuit having a pair of input terminals across which said power supply is connected to provide alternating current voltage thereto and having a pair of output terminals and having said winding connected between one of said input terminals and one of said output terminals and having a first resistance connected between said one input terminal and the other of said output terminals and having a second resistance connected between said other input terminal and said other output terminal and having a third resistance connected between said one output terminal and said other input terminal, an amplifier having an input coupled to said other output terminal of said bridge, a rectifier receiving the output of said amplifier, a Schmitt trigger circuit having an input coupled to said rectifier to receive the output thereof, and having a reference voltage input and having an output which is energized in response to a predetermined voltage difference between said input and reference input, and means coupled to said output of said Schmitt trigger circuit for producing a faulty element signal in response to triggering of said Schmitt trigger circuit.

7. The combination defined in claim 6 wherein one of said resistances of said bridge circuit is a variable resistance, further comprising a variable capacitor connected in parallel with one of said resistances, and means for indicating the magnitude of the voltage difference between said output terminals of said bridge circuit.

8. The combination defined in claim 1 wherein said elements are cylindrical bushings having an axial bore which is of larger diameter at one end of said bushings than at the other end thereof, wherein said test surface of said core is circular and said gap thereof is annular and coaxially situated in said test surface, said annular gap having an inner diameter at least equal to that of the small diameter ends of said bushing bores and having an outer diameter not exceeding that of the large diameter ends of said bushing bores.

* * * * *

UNITED STATES PATENT OFFICE
CERTIFICATE OF CORRECTION

Patent No. 4,050,010          Dated September 20, 1977

Inventor(s) THEOPHILE ISNARD

It is certified that error appears in the above-identified patent and that said Letters Patent are hereby corrected as shown below:

The designation of the Assignee as "Caterpillar France S.A. Isere, France" should read:

--Caterpillar Tractor Co., Peoria, Illinois--

Signed and Sealed this

First Day of May 1979

[SEAL]

Attest:

RUTH C. MASON
Attesting Officer

DONALD W. BANNER
Commissioner of Patents and Trademarks